United States Patent
Zhang et al.

(10) Patent No.: US 12,216,461 B2
(45) Date of Patent: Feb. 4, 2025

(54) AGV SCHEDULING METHOD BASED ON NARROW ALLEY, ELECTRONIC EQUIPMENT AND STORAGE MEDIUM

(71) Applicant: Machinery Technology Development Co., Ltd, Beijing (CN)

(72) Inventors: Sheng Zhang, Beijing (CN); Haoyuan Qu, Beijing (CN); Peng Zhao, Beijing (CN); Bin Xu, Beijing (CN); Yang Liu, Beijing (CN); Changchen Li, Beijing (CN)

(73) Assignee: Machinery Technology Development Co., Ltd, Beijing (CN)

( * ) Notice: Subject to any disclaimer, the term of this patent is extended or adjusted under 35 U.S.C. 154(b) by 0 days.

(21) Appl. No.: 18/434,851

(22) Filed: Feb. 7, 2024

(65) Prior Publication Data
US 2024/0288858 A1    Aug. 29, 2024

(30) Foreign Application Priority Data
Feb. 23, 2023  (CN) .......................... 202310162073.X (51) Int. Cl.
*G05B 19/418*    (2006.01)
(52) U.S. Cl.
CPC . *G05B 19/41895* (2013.01); *G05B 19/41865* (2013.01)
(58) Field of Classification Search
CPC .................. G05B 19/41895; G05B 19/41865
See application file for complete search history.

(56) References Cited

U.S. PATENT DOCUMENTS

| | | | | |
|---|---|---|---|---|
| 10,816,996 B1* | 10/2020 | Kiesel | ............... | G05D 1/0289 |
| 2007/0290040 A1* | 12/2007 | Wurman | ............... | G05D 1/0289 |
| | | | | 235/385 |
| 2009/0063035 A1* | 3/2009 | Mandel | ............... | G06F 30/18 |
| | | | | 701/437 |

(Continued)

FOREIGN PATENT DOCUMENTS

| | | |
|---|---|---|
| CN | 110262471 A | 9/2019 |
| CN | 110275492 A | 9/2019 |

(Continued)

*Primary Examiner* — Stephen Holwerda
(74) *Attorney, Agent, or Firm* — Bayramoglu Law Offices LLC (57) ABSTRACT

An Automated Guided Vehicle (AGV) scheduling method based on a narrow alley, electronic equipment and a storage medium are provided, and the method includes: through an AGV scheduling system, receiving a message that a to-be-driven-in AGV arrives at a driving-in platform, obtaining job information of each AGV in the narrow alley at the current moment, and determining whether the to-be-driven-in AGV can enter the narrow alley for performing the job fully according to the number of the AGVs in the narrow alley at the current moment, the job information and a loading/unloading position where the to-be-driven-in AGV will perform the job, so as to achieve concurrent collaborative job of the AGVs as many as possible in a confined workspace by making use of fragmented time and every bit of time, to form an efficient and flexible distribution solution, and to further achieve intelligent scheduling of the AGVs.

20 Claims, 4 Drawing Sheets

S1
Through the AGV scheduling system, receive a message that a to-be-driven-in AGV arrives at a driving-in platform S2
Through the AGV scheduling system, obtain job information of each AGV in the narrow alley at the current moment, and sta tistically obtain the number of the AGVs in the narrow alley at the current mome nt, wherein the job information of each AGV includes one or more of a running direction, a job status, a loading/unloa ding position of the job, and current running positions S3
Through the AGV scheduling system, determine whether the to-be- driven-in AGV can enter the narrow alley for performing the job according to the number of the AGV s in the narrow alley at the current moment, the job information and a loading/unloading position where the to-be-driven-in AGV will perform the job.

(56) References Cited

U.S. PATENT DOCUMENTS

| | | | |
|---|---|---|---|
| 2012/0330458 A1* | 12/2012 | Weiss | B66F 9/063 |
| | | | 901/1 |
| 2013/0103552 A1* | 4/2013 | Hoffman | G06Q 10/00 |
| | | | 705/28 |
| 2014/0032035 A1* | 1/2014 | Thomson | G05D 1/0274 |
| | | | 701/25 |
| 2014/0277691 A1* | 9/2014 | Jacobus | B66F 9/24 |
| | | | 700/216 |
| 2018/0299882 A1* | 10/2018 | Kichkaylo | G05B 19/41895 |
| 2020/0198892 A1* | 6/2020 | Ahmann | B65G 1/1373 |
| 2021/0165424 A1* | 6/2021 | Bijelovic | G05D 1/0297 |

FOREIGN PATENT DOCUMENTS

| | | |
|---|---|---|
| CN | 111462472 A | 7/2020 |
| CN | 112368661 A | 2/2021 |
| CN | 114153211 A | 3/2022 |

* cited by examiner

AGV SCHEDULING METHOD BASED ON NARROW ALLEY, ELECTRONIC EQUIPMENT AND STORAGE MEDIUM

CROSS-REFERENCE TO THE RELATED APPLICATION

This application is based upon and claims priority to Chinese Patent Application No. 202310162073.X, filed on Feb. 23, 2023, the entire contents of which are incorporated herein by reference.

TECHNICAL FIELD

The present disclosure relates to the technical field of Automated Guided Vehicle (AGV) scheduling, and particularly relates to an AGV scheduling method based on a narrow alley, electronic equipment and a storage medium.

BACKGROUND

Automated Guided Vehicle (AGV) systems have been widely used in the manufacturing industry, particularly in the processing of construction machinery equipment, rail transportation equipment, 3C products (i.e. computers, communication and consumer electronics products) and other industries, distribution and recycling of material containers for assembling production, and other scenarios. In addition, the AGV system is widely used in the storage and retrieval of goods on narrow alley shelves. In the actual scheduling site of any of the above industries, users, in consideration of factors such as production capacity and storage capacity, might reserve ample space for processing and assembly equipment or stereoscopic warehouses in the confined physical space as much as possible, so that logistics operation alleys left for the AGVs are very limited, especially when the scheduling site includes a plurality of narrow alleys, with one end of each narrow alley closed and the other end opened. After the AGV system is introduced in the above scenario, the scheduling technology solutions adopted by most manufacturers usually are extensive management modes, that is, only one AGV is allowed to perform a distribution job in each narrow alley at a time, and only after it completes the job, the other AGVs are allowed to perform other distribution jobs. Therefore, this scheduling mode has technical defects such as low distribution efficiency, low equipment utilization efficiency, and weak flexibility and intelligence.

SUMMARY

An objective of the present disclosure is to provide an Automated Guided Vehicle (AGV) scheduling method based on a narrow alley, electronic equipment and a storage medium, so as to solve the technical defects in the prior art as mentioned in the Background.

In order to achieve the above objective, the present disclosure provides an AGV scheduling method based on a narrow alley, wherein the scheduling site includes a plurality of narrow alleys and an AGV system, wherein each of the narrow alley is provided with a plurality of loading/unloading positions, and the AGV system includes an AGV scheduling system and a plurality of AGVs, the AGVs are allowed to drive in and out from one end of the narrow alley, while the other end thereof is closed or the AGVs are not allowed to drive in and out from the other end thereof, and only one AGV is allowed to drive in and out in a width direction of the narrow alley at a time, an electronic map of each AGV is pre-configured with information of driving-in platforms and driving-out platforms, where the driving-in platform is located in an entrance direction of the narrow alley, and the driving-out platform is located in the exit direction of the narrow alley, the scheduling method includes the following steps of:
S1: through the AGV scheduling system, receiving a message that a to-be-driven-in AGV arrives at a driving-in platform;
S2: through the AGV scheduling system, obtaining job information of each AGV in the narrow alley at the current moment, and statistically obtaining the number of the AGVs in the narrow alley at the current moment, wherein the job information of each AGV includes one or more of a running direction, a job status, a loading/unloading position of the job, and current running positions; and
S3: through the AGV scheduling system, determining whether the to-be-driven-in AGV can enter the narrow alley for performing the job according to the number of the AGVs in the narrow alley at the current moment, the job information and a loading/unloading position where the to-be-driven-in AGV will perform the job.

Optionally, the step S3 includes:
when the AGV scheduling system determines that the number of the AGVs in the narrow alley at the current moment is zero, sending a driving-in permission message to the to-be-driven-in AGV through the AGV scheduling system, to schedule the to-be-driven-in AGV to perform the job in the narrow alley; and when the AGV scheduling system determines that the number of the AGVs in the narrow alley at the current moment is not zero, further comprehensively determining whether the to-be-driven-in AGV can enter the narrow alley for performing the job according to a relative position between the loading/unloading position where each AGV in the narrow alley will perform the job and the loading/unloading position where the to-be-driven-in AGV will perform the job, and/or a relative position between the current running position of each AGV in the narrow alley and the loading/unloading position where the to-be-driven-in AGV will perform the job.

Optionally, the step S3 further includes:
when the AGV scheduling system determines that the running direction of each AGV in the narrow alley at the current moment is towards the direction of its loading/unloading position, further determining the relative position between the loading/unloading position where each AGV in the narrow alley will perform the job and the loading/unloading position where the to-be-driven-in AGV will perform the job; and when the loading/unloading position where the to-be-driven-in AGV will perform the job is outside the narrow alley relative to the loading/unloading position where any AGV in the narrow alley will perform the job, sending the driving-in permission messages to the to-be-driven-in AGV through the AGV scheduling system, to schedule the to-be-driven-in AGV to perform the job in the narrow alley.

Optionally, the step S3 further includes:
when the AGV scheduling system determines that the running direction of each AGV in the narrow alley at the current moment is towards the direction of driving away from its loading/unloading position or each AGV therein is performing the job at its loading/unloading position, further determining a relative position between the current running position of each AGV in the narrow alley and the loading/unloading position where the to-be-driven-in AGV will perform the job; and when a distance between the loading/unloading position where the to-be-driven-in AGV will perform the job and the current running position of any AGV in the narrow alley is greater than a distance between the to-be-driven-in AGV and the loading/unloading position where the to-be-driven-in AGV will perform the job, sending a driving-in permission message to the to-be-driven-in AGV through the AGV scheduling system, to schedule the to-be-driven-in AGV to perform the job in the narrow alley.

Optionally, the step S3 further includes:

when the AGV scheduling system determines that the running direction of AGVs in the narrow alley at the current moment includes the direction of driving away from the loading/unloading position and the direction of driving toward the loading/unloading position, further determining the relative positions among the current running position of each AGV in the narrow alley, the loading/unloading position where each AGV in the narrow alley will perform the job and the loading/unloading position where the to-be-driven-in AGV will perform the job; and when a distance between the loading/unloading position where the to-be-driven-in AGV will perform the job and the current running position of each AGV in the narrow alley is greater than a distance between the to-be-driven-in AGV and the loading/unloading position where the to-be-driven-in AGV will perform the job, and the loading/unloading position where the to-be-driven-in AGV will perform the job is outside the narrow alley relative to the loading/unloading position where the AGV in the narrow alley will perform the job, sending a driving-in permission message to the to-be-driven-in AGV through the AGV scheduling system, to schedule the to-be-driven-in AGV to perform the job in the narrow alley.

Optionally, the scheduling method further includes:

in the AGV scheduling system, pre-configuring an upper limit threshold for the number of the AGVs allowed to stay in the narrow alley at the same time; and when the AGV scheduling system determines that the number of the AGVs in the narrow alley at the current moment reaches the upper limit threshold, sending no driving-in permission message to the to-be-driven-in AGV through the AGV scheduling system.

Optionally, the scheduling method further includes:

after the AGV scheduling system sends a driving-in permission message to the to-be-driven-in AGV, recording the number of the to-be-driven-in AGV and the number of the driving-in narrow alley through the AGV scheduling system, to dynamically schedule the quantity of the AGVs in the narrow alley in combination with the AGV scheduling system.

Optionally, the scheduling method further includes:

after the AGV scheduling system receives a message that one AGV in one narrow alley arrives at the driving-out platform, clearing the recorded number of the AGV arriving at the driving-out platform and the number of the driving-out narrow alley through the AGV scheduling system, to dynamically schedule the quantity of the AGVs in the narrow alley in combination with the AGV scheduling system.

In a further aspect, the present disclosure further provides electronic equipment, including a processor and a memory, where computer-readable instructions are stored on the memory, and when the computer-readable instructions are executed by the processor, the AGV scheduling method based on a narrow alley is implemented.

In yet another aspect, the present disclosure further provides a computer readable storage medium on which a computer program is stored, where when the computer program is executed by the processor, the AGV scheduling method based on a narrow alley is implemented.

The method of the present disclosure has the following advantages:

The AGV scheduling method based on a narrow alley provided by the present disclosure determines whether the to-be-driven-in AGV can enter the narrow alley for the job fully according to the number of the AGVs in the narrow alley at the current moment, the job information and a loading/unloading position where the to-be-driven-in AGV will perform the job, so as to achieve concurrent collaborative job and intelligent scheduling of the AGVs as many as possible in a confined workspace by making use of fragmented time and every bit of time, and to form an efficient and flexible distribution solution. The method can be industrialized in application scenarios such as material distribution for production lines and storage and retrieval of goods in narrow alleys.

DETAILED DESCRIPTION OF THE EMBODIMENTS

The following embodiments are used for describing the present disclosure, but are not used for limiting the scope of the present disclosure. In order to make the objectives, technical solutions and advantages of the embodiments of the present disclosure clearer, the technical solutions in the embodiments of the present disclosure will be clearly and completely described with reference to the accompanying drawings in the examples of the present disclosure. Apparently, the described examples are merely exemplary, and not exhaustive. All other embodiments acquired by those of ordinarily skilled in the art without making creative efforts based on the described embodiments of the present disclosure fall within the scope of protection of the present disclosure.

Figure 1:
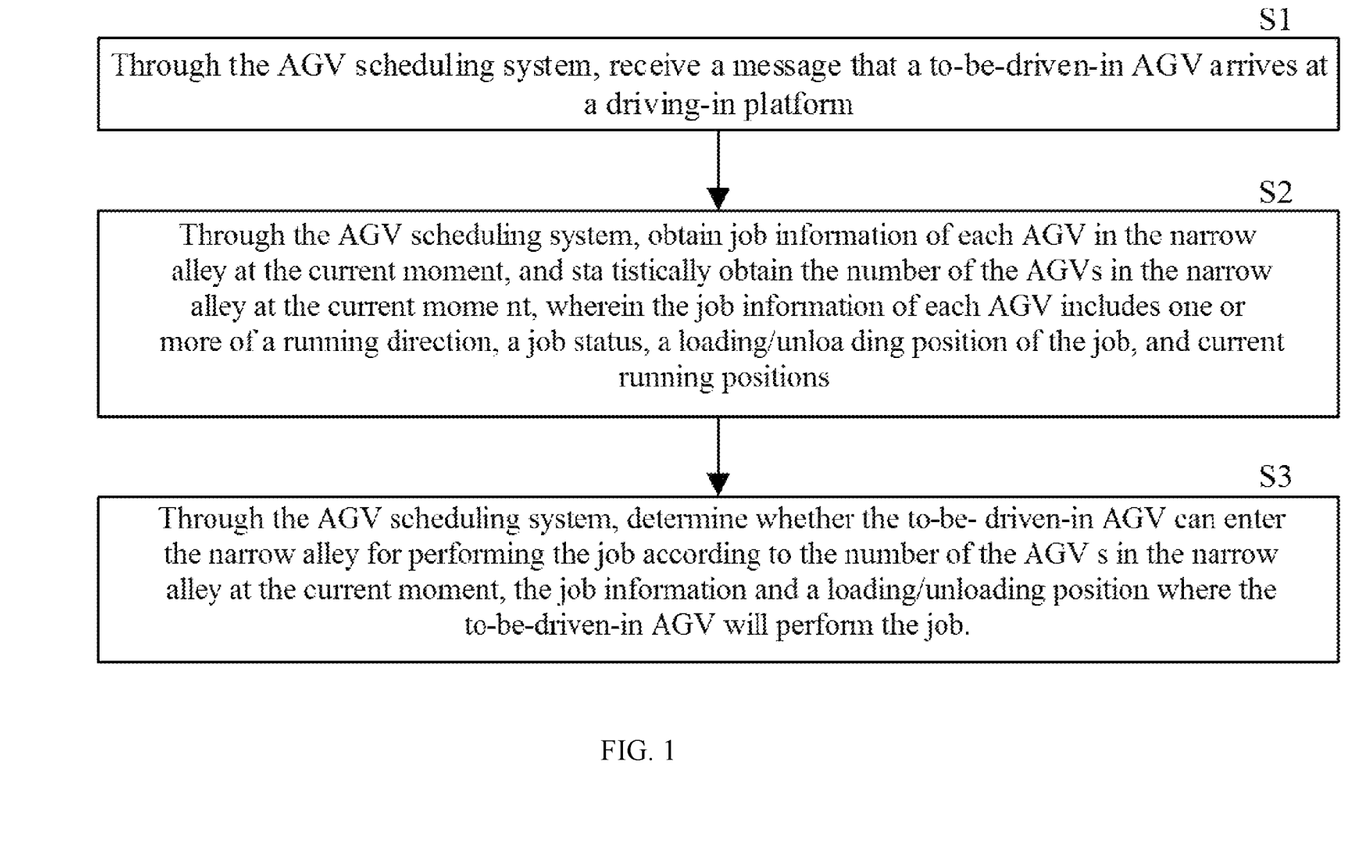
FIG. 1 is a schematic flowchart of an automated guided vehicle (AGV) scheduling method based on a narrow alley according to an embodiment of the present disclosure.

In an aspect, as shown in FIG. 1, in an example, there is provided an AGV scheduling method based on a narrow alley, wherein a scheduling site includes a plurality of narrow alleys and an AGV system, wherein each of the narrow alleys is provided with a plurality of loading/unloading positions, and the AGV system includes an AGV scheduling system and a plurality of AGVs. The AGVs are allowed to drive in and out from one end of the narrow alley, while the other end thereof is closed or the AGVs are not allowed to drive in and out from the other end thereof, and only one AGV is allowed to drive in and out in a width direction of the narrow alley at a time. An electronic map of each AGV is pre-configured with information of a driving-in platform and a driving-out platform, where the driving-in platform is located in an entrance direction of the narrow alley, and the driving-out platform is located in an exit direction of the narrow alley.

The scheduling method includes the following steps of:

S1: through the AGV scheduling system, receiving a message that a to-be-driven-in AGV arrives at a driving-in platform;

S2: through the AGV scheduling system, obtaining job information of each AGV in the narrow alley at the current moment, and statistically obtaining the number of the AGVs in the narrow alley at the current moment, wherein the job information of each AGV includes one or more of a running direction, a job status, a loading/unloading position of the job, and current running positions; and S3: through the AGV scheduling system, determining whether the to-be-driven-in AGV can enter the narrow alley for performing the job according to the number of the AGVs in the narrow alley at the current moment, the job information and a loading/unloading position where the to-be-driven-in AGV will perform the job.

In this example, the electronic map of each AGV is pre-configured with information of a driving-in platform and a driving-out platform, and the electronic map of each AGV is consistent with the electronic map of the AGV scheduling system; and whether the to-be-driven-in AGV arrives at the driving-in platform is determined in a manner of locating and tracking, and a message of arriving at the driving-in platform is sent to the AGV scheduling system.

In addition, the AGV scheduling system in this example has AGV management functions, including the functions of querying an AGV number, a narrow alley number, an AGV status (the status of driving-in platform and the status of driving-out platform), an AGV job status, a loading/unloading position for AGV job, a current running position of the AGV, an AGV running direction and the time of narrow alley access, and of managing a specific AGV or/and all AGVs driving into and out of a platform. The AGV scheduling system, through the AGV management functions, obtains job information of each AGV in the narrow alley at the current moment, and statistically obtains the number of the AGVs in the narrow alley at the current moment.

Optionally, the Step S3 in the AGV scheduling method based on a narrow alley in this example specifically includes:

when the AGV scheduling system determines that the number of the AGVs in the narrow alley at the current moment is zero, sending a driving-in permission message to the to-be-driven-in AGV through the AGV scheduling system, to schedule the to-be-driven-in AGV to perform the job in the narrow alley.

Figure 2:
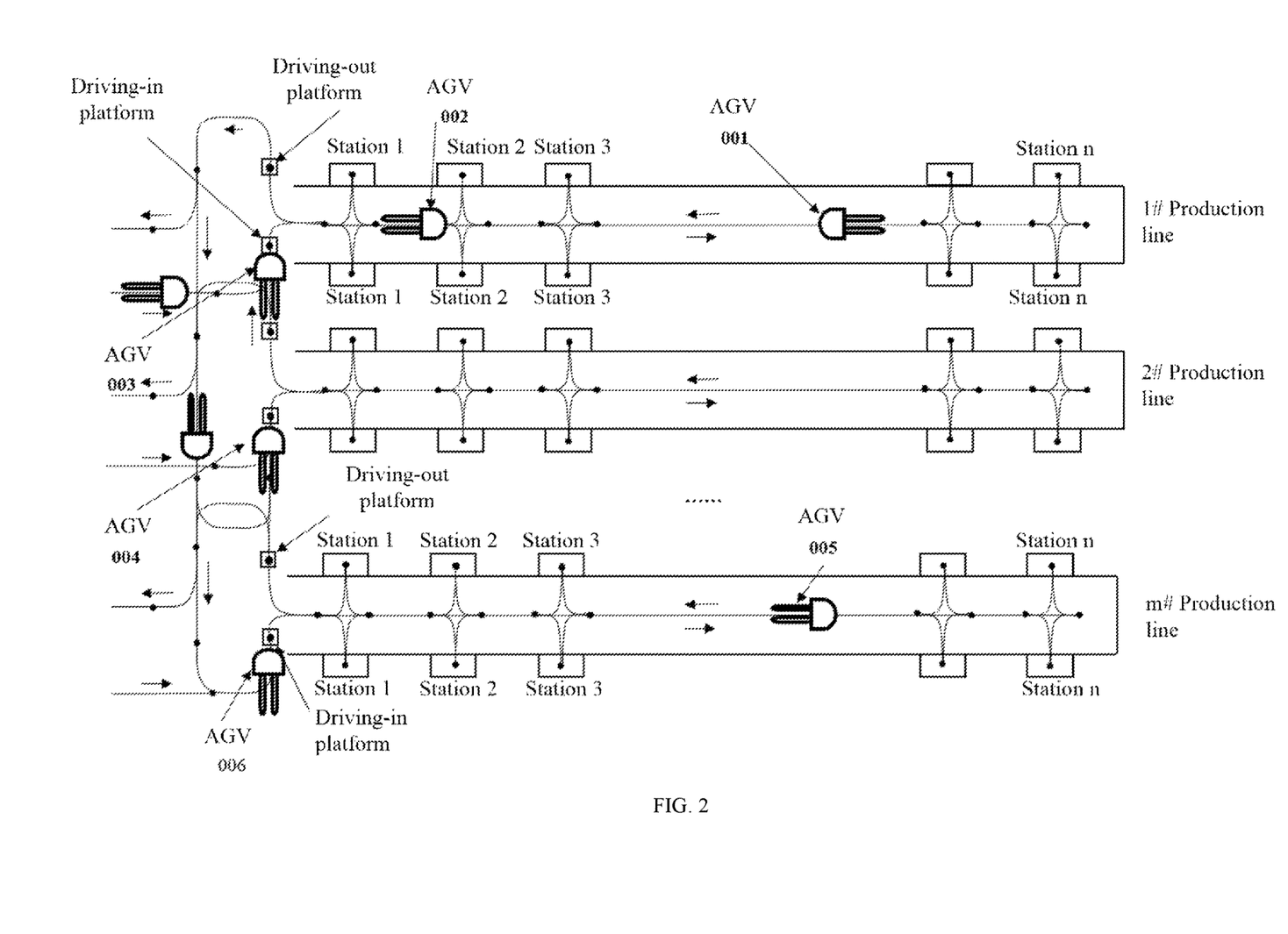
FIG. 2 is a schematic diagram of an application in a narrow alley production line according to an embodiment of the present disclosure.

Specifically, as shown in FIG. 2, taking a narrow alley production line as an example: for a 2# production line where there is no AGV running, when a to-be-driven-in AGV 004 (004 is the number of the AGV) arrives at the driving-in platform of the 2# production line, the AGV 004 is allowed to directly drive into the 2# production line to perform loading/unloading the job.

Optionally, the Step S3 in the AGV scheduling method based on a narrow alley in this example further includes:

when the AGV scheduling system determines that the running direction of each AGV in the narrow alley at the current moment is towards the direction of its loading/unloading position, further determining a relative position between the loading/unloading position where each AGV in the narrow alley will perform the job and the loading/unloading position where the to-be-driven-in AGV will perform the job; and when the loading/unloading position where the to-be-driven-in AGV will perform the job is outside the narrow alley relative to the loading/unloading position where any AGV in the narrow alley will perform the job, sending a driving-in permission message to the to-be-driven-in AGV through the AGV scheduling system, to schedule the to-be-driven-in AGV to perform the job in the narrow alley.

Specifically, as shown in FIG. 2, taking a narrow alley production line as an example: for a m# production line where an AGV 005 runs towards a certain station (i.e., running towards a direction of the loading/unloading position, as indicated by the right arrow in FIG. 2) to perform loading/unloading the job, when a to-be-driven-in AGV 006 arrives at the driving-in platform of the m# production line, it is necessary to determine whether the loading/unloading position where the to-be-driven-in AGV 006 will perform the job is outside the narrow alley relative to the loading/unloading position where the AGV 005 in the narrow alley production line will perform the job, and when the AGV 006 is outside the narrow alley, the AGV 006 will drive into the m# production line for performing the job; otherwise, the AGV 006 will further wait for the job until the AGV 005 in the m# production line leaves the driving-out platform.

Optionally, the step S3 in the AGV scheduling method based on a narrow alley in this example further includes:

when the AGV scheduling system determines that the running direction of each AGV in the narrow alley at the current moment is towards the direction of driving away from its loading/unloading position or each AGV therein is performing the job at its loading/unloading position, further determining a relative position between the current running position of each AGV in the narrow alley and the loading/unloading position where the to-be-driven-in AGV will perform the job; and when a distance between the loading/unloading position where the to-be-driven-in AGV will perform the job and the current running position of any AGV in the narrow alley is greater than a distance between the to-be-driven-in AGV and the loading/unloading position where the to-be-driven-in AGV will perform the job, sending a driving-in permission message to the to-be-driven-in AGV through the AGV scheduling system, to schedule the to-be-driven-in AGV to perform the job in the narrow alley.

Figure 3:
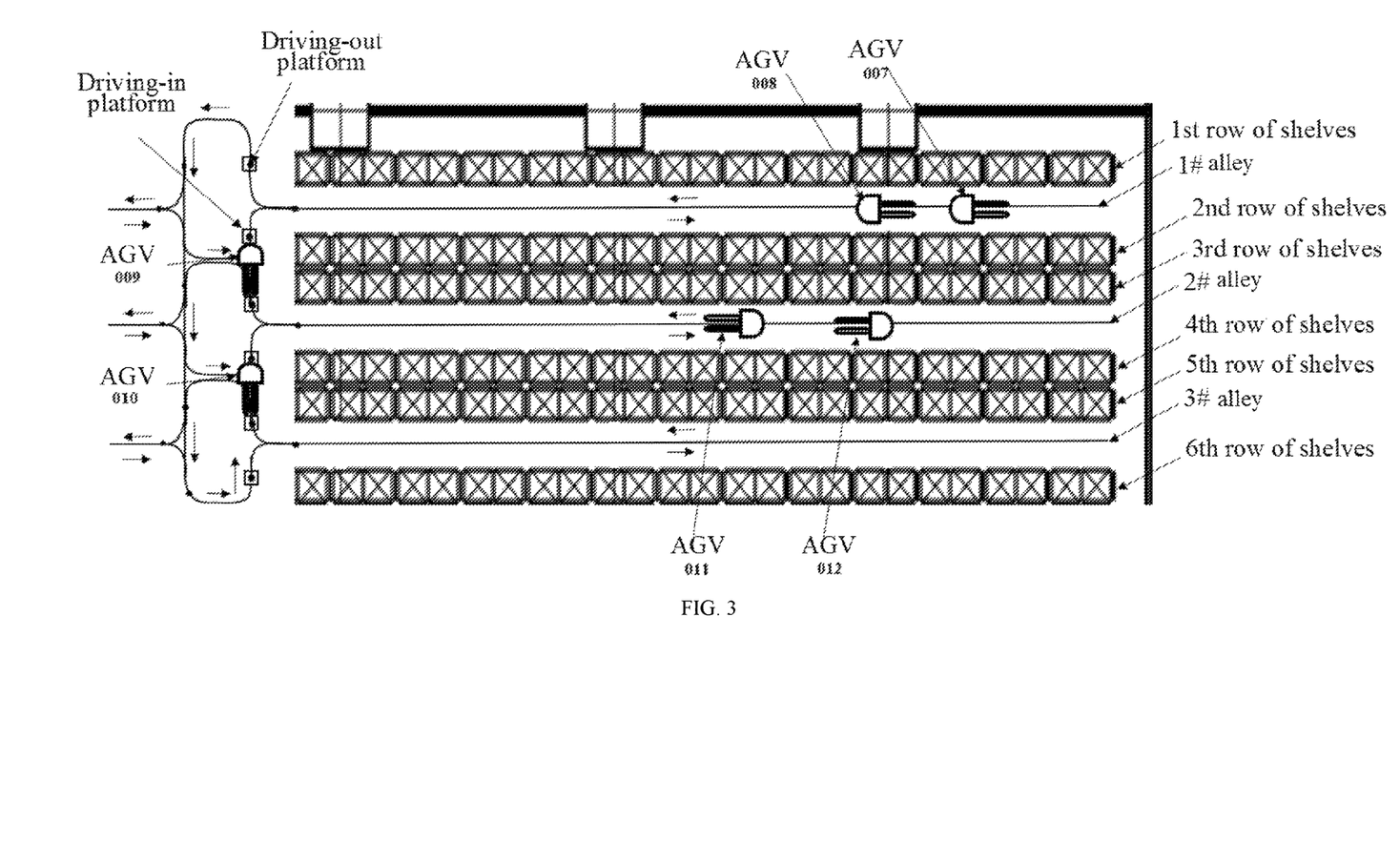
FIG. 3 is a schematic diagram of an application in a narrow alley stereoscopic warehouse according to an embodiment of the present disclosure.

Specifically, as shown in FIG. 3, taking a narrow-alley stereoscopic warehouse as an example: for a 1# alley where there are an AGV 007 and an AGV 008, both of which have completed the loading or/unloading the job and are running in a direction of driving away from the loading/unloading positions (as indicated by the left arrow in FIG. 3), when a to-be-driven-in AGV 009 arrives at the driving-in platform of the 1# alley, it is necessary to determine a relative position between the current running position of each of the AGV 007 and the AGV 008 in the 1# alley and the loading/unloading position where the to-be-driven-in AGV 009 will perform the job, and when a distance between the loading/unloading position where the to-be-driven-in AGV 009 will perform the job and the current running position of each of the AGV 007 and the AGV 008 in the 1# alley is greater than a distance between the to-be-driven-in AGV 009 and the loading/unloading position where the to-be-driven-in AGV 009 will perform the job, the AGV 009 is allowed to enter into the 1# alley for performing the job; otherwise, the AGV 009 will continue to wait.

For a 2# alley where there are an AGV 011 and an AGV 012, both of which are performing the job at their loading/unloading positions, when a to-be-driven-in AGV 010 arrives at the driving-in platform of the 2# alley, it is necessary to determine a relative position between the loading/unloading position where each of the AGV 011 and the AGV 012 in the 2# alley is performing the job and the loading/unloading position where the to-be-driven-in AGV 010 will perform the job, and when a distance between the loading/unloading position where the to-be-driven-in AGV 010 will perform the job and the loading/unloading position where each of the AGV 011 and the AGV 012 in the 2# alley is performing the job is greater than a distance between the to-be-driven-in AGV 010 and the loading/unloading position where the to-be-driven-in AGV 010 will perform the job, the AGV 010 is allowed to enter into the 2# alley for performing the job; and otherwise, the AGV 010 will continue to wait.

Optionally, the step S3 in the AGV scheduling method based on a narrow alley in this embodiment further includes:
when the AGV scheduling system determines that the running directions of AGVs in the narrow alley at the current moment include the direction of driving away from the loading/unloading position and the direction of driving toward the loading/unloading position, further determining the relative positions among the current running position of each AGV in the narrow alley, the loading/unloading position where each AGV in the narrow alley will perform the job and the loading/unloading position where the to-be-driven-in AGV will perform the job; and when a distance between the loading/unloading position where the to-be-driven-in AGV will perform the job and the current running position of each AGV in the narrow alley is greater than a distance between the to-be-driven-in AGV and the loading/unloading position where the to-be-driven-in AGV will perform the job, and the loading/unloading position where the to-be-driven-in AGV will perform the job is outside the narrow alley relative to the loading/unloading position where the AGV in the narrow alley will perform the job, sending a driving-in permission message to the to-be-driven-in AGV, to schedule the to-be-driven-in AGV to perform the job in the narrow alley.

Specifically, as shown in FIG. 2, taking a narrow alley production line as an example: for the 1# production line where a to-be-driven-in AGV 003 arrives at the driving-in platform of the 1# production line, an AGV 002 inside the 1# production line is driving towards the loading/unloading position for performing the job (viz. towards the station 10), and another AGV 001 has completed the loading/unloading job and as indicated by the left arrow direction in FIG. 2, is running in the direction of driving away from the loading/unloading position (the current running position of the AGV 001 is the station 20), in this case, when the loading/unloading position of the to-be-driven-in AGV 003 will perform the job at the station 8, and when the distance between the loading/unloading position where the to-be-driven-in AGV 003 will perform the job and the current running position of the AGV 001 in the narrow alley is greater than the distance between the to-be-driven-in AGV 003 and the loading/unloading position where the to-be-driven-in AGV 003 will perform the job, and the loading/unloading position of the to-be-driven-in AGV 003 will perform the job is outside the narrow alley relative to the loading/unloading position where the AGV 002 in the narrow alley will perform the job, the to-be-driven-in AGV 003 can enter into the 1# production line to perform the loading/unloading job.

Optionally, the AGV scheduling method based on a narrow alley in this embodiment further includes:
in the AGV scheduling system, pre-configuring an upper limit threshold for the number of the AGVs allowed to stay in the narrow alley at the same time; and
when the AGV scheduling system determines that the number of the AGVs in the narrow alley at the current moment reaches the upper limit threshold, sending no driving-in permission message to the to-be-driven-in AGV through the AGV scheduling system.

In this example, the AGV scheduling system has a function of configuring the maximum number of AGVs in a narrow alley, through which the specific maximum number of AGVs in the narrow alley can be queried and set, to prevent all AGVs from entering the same narrow alley, thereby achieving efficiency of balanced material container distribution. According to the method of this embodiment, dynamic scheduling is performed according to the number of configured AGVs.

It should be noted that in this example, the upper limit threshold can be 2, 3, 4, 5, etc., and of course, it can also be other values, which are determined according to the actual situation of the narrow alley, and will not be listed and explained here.

Optionally, the AGV scheduling method based on a narrow alley in this embodiment further includes
after the AGV scheduling system sends a driving-in permission message to the to-be-driven-in AGV, recording the number of the to-be-driven-in AGV and the number of the driving-in narrow alley through the AGV scheduling system, to dynamically schedule the quantity of the AGVs in the narrow alley in combination with the AGV scheduling system.

In this embodiment, after the AGV scheduling system sends a driving-in permission message to the to-be-driven-in AGV, that is, when the to-be-driven-in AGV leaves the driving-in platform and enters the narrow alley, the AGV scheduling system needs to record the number of the to-be-driven-in AGV and the number of the driving-in narrow alley and update the process record, to ensure the accuracy of scheduling.

Optionally, the AGV scheduling method based on a narrow alley in this embodiment further includes:
after the AGV scheduling system receives a message that one AGV in one narrow alley arrives at the driving-out platform, clearing the recorded number of the AGV arriving at the driving-out platform and the number of the driving-out narrow alley through the AGV scheduling system, to dynamically schedule the quantity of the AGVs in the narrow alley in combination with the AGV scheduling system.

In this embodiment, after the AGV scheduling system receives a message that one AGV in one narrow alley arrives at the driving-out platform, that is, when the AGV in the narrow alley leaves the narrow alley, the AGV scheduling system needs to clear the recorded number of the AGV arriving at the driving-out platform and the number of the driving-out narrow alley and update the process record, to ensure the accuracy of scheduling.

To sum up, the AGV scheduling method based on a narrow alley provided by the embodiments of the present disclosure determines whether the to-be-driven-in AGV can enter the narrow alley for performing the job fully according to the number of the AGVs in the narrow alley at the current moment, the job information and a loading/unloading position where the to-be-driven-in AGV will perform the job, so as to achieve concurrent collaborative job and intelligent scheduling of the AGVs as many as possible in a confined workspace by making use of fragmented time and every bit of time, and to form an efficient and flexible distribution solution. The method can be industrialized in application scenarios such as material distribution for production lines and narrow-alley stereoscopic warehouses.

In a further aspect, in one example, there is further provided an electronic equipment, including a processor and a memory, where computer-readable instructions are stored on the memory, and when the computer-readable instructions are executed by the processor, the AGV scheduling method based on a narrow alley in the above embodiments is implemented.

Figure 4:
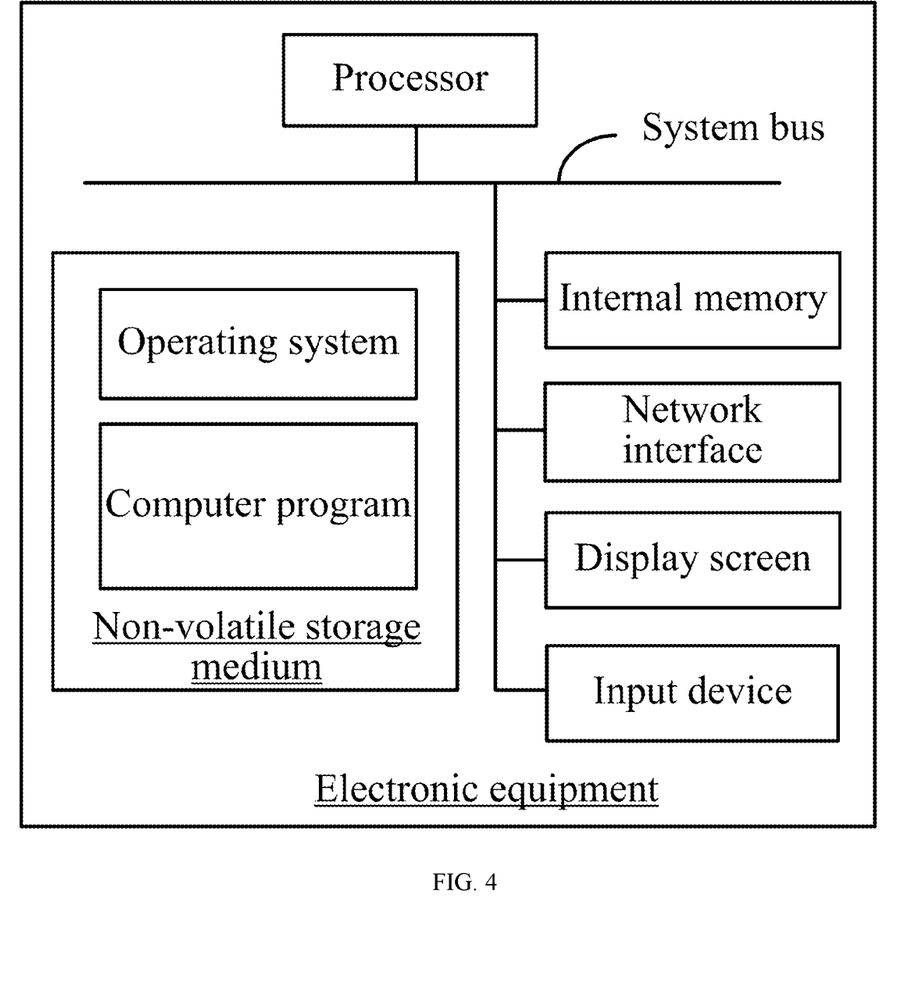
FIG. 4 is a schematic diagram of an application of electronic equipment according to an embodiment of the present disclosure.

FIG. 4 illustrates the structural diagram of electronic equipment according to one example of the present disclosure. As shown in FIG. 4, the electronic equipment includes a processor, a memory, a communication interface, a display screen and an input device that are connected through a system bus. The processor of the electronic equipment is configured to provide computing and control capabilities. The memory of the electronic equipment includes a non-volatile storage medium and an internal memory. The non-volatile storage medium stores an operating system and a computer program. This internal memory provides an environment for the execution of the operating system and the computer program in the non-volatile storage medium. The communication interface of the electronic equipment is configured for wired or wireless communication with external terminals. The wireless communication can be implemented through WIFI™, an operator network, near field communication (NFC) or any other technologies. The display screen of the electronic equipment may be a liquid crystal display screen or an electronic ink display screen, and the input apparatus of the electronic equipment may be a touch layer covering the display screen, or a button, a trackball or a touchpad disposed on a shell of the electronic equipment, or an external keyboard, a touch pad or a mouse, etc. Those skilled in the art can understand that the structure shown in FIG. 4 is only a diagram of a partial structure related to the technical solution of the present disclosure, and does not constitute a limitation to the electronic equipment to which the solution of the present disclosure is applied. The specific electronic equipment may include more or fewer components than those shown in the figure, or combine certain components, or have a different arrangement of components.

In yet another aspect, in one example, there is further provided a storage medium, and the storage medium stores a computer program, wherein when the computer program is executed by the processor, the AGV scheduling method based on a narrow alley is implemented. Those of ordinary skill in the art can understand that all or part of the steps in various methods of the embodiments can be completed by instructing relevant hardware by means of a program, and the program may be stored in a computer-readable storage medium. The storage medium can include a Flash disk, a read-only memory (ROM), a random access memory (RAM), a magnetic disk or an optical disk, etc.

Although the present disclosure has been described in detail with general descriptions and specific embodiments, it is apparent that those skilled in the art can make some modifications or improvements on the basis of the present disclosure. Therefore, these modifications or improvements made without departing from the spirit of the present disclosure all fall within the scope of protection of the present disclosure.

What is claimed is:

1. An automated guided vehicle (AGV) scheduling method based on an alley, wherein a scheduling site comprises a plurality of alleys and an AGV system, wherein each of the alleys is provided with a plurality of loading/unloading positions, and the AGV system comprises an AGV scheduling system and a plurality of AGVs; the AGVs are allowed to drive in and out from one end of the alley, while the other end thereof is closed or the AGVs are not allowed to drive in and out from the other end thereof, and only one AGV is allowed to drive in and out in a width direction of the alley at a time; an electronic map of each AGV is pre-configured with information of a driving-in platform and a driving-out platform, wherein the driving-in platform is located in an entrance direction of the alley, and the driving-out platform is located in an exit direction of the alley;

wherein the scheduling method comprises:

receiving, through the AGV scheduling system, a message that a to-be-driven-in AGV arrives at a driving-in platform;

obtaining, through the AGV scheduling system, job information of each AGV in the alley at the current moment, and statistically obtaining the number of the AGVs in the alley at the current moment, wherein the job information of each AGV includes one or more of a running direction, a job status, a loading/unloading position of the job, and current running positions; and determining, through the AGV scheduling system, whether the to-be-driven-in AGV can enter the alley for performing the job according to the number of the AGVs in the alley at the current moment, the job information and a loading/unloading position where the to-be-driven-in AGV will perform the job;

wherein, the determining, through the AGV scheduling system, whether the to-be-driven-in AGV can enter the alley for performing the job according to the number of the AGVs in the alley at the current moment, the job information and a loading/unloading position where the to-be-driven-in AGV will perform the job comprises:

determining that the number of the AGVs in the alley at the current moment is not zero, and further comprehensively determining whether the to-be-driven-in AGV can enter the alley for performing the job according to a relative position between the loading/unloading position where each AGV in the alley will perform the job and the loading/unloading position where the to-be-driven-in AGV will perform the job and/or a relative position between the current running position of each AGV in the alley and the loading/unloading position where the to-be-driven-in AGV will perform the job;

wherein when the AGV scheduling system determines that the running directions of AGVs in the alley at the current moment comprise both the direction of driving away from the loading/unloading position and the direction of driving toward the loading/unloading position, the method further comprises:

determining the relative positions among the current running position of each AGV in the alley, the loading/unloading position where each AGV in the alley will perform the job, and the loading/unloading position where the to-be-driven-in AGV will perform the job; and when the AGV scheduling system determines that a distance between the loading/unloading position where the to-be-driven-in AGV will perform the job and the current running position of each AGV in the alley is greater than a distance between the to-be-driven-in AGV and the loading/unloading position where the to-be-driven-in AGV will perform the job, and the loading/unloading position where the to-be-driven-in AGV will perform the job is outside the alley relative to the loading/unloading position where the AGV in the alley will perform the job, sending a driving-in permission message to the to-be-driven-in AGV through the AGV scheduling system, to schedule the to-be-driven-in AGV to perform the job in the alley.

2. The AGV scheduling method based on the alley of claim 1, wherein when the AGV scheduling system determines that the running direction of each AGV in the alley at the current moment is towards the direction of its loading/unloading position, the method further comprises:
  determining a relative position between the loading/unloading position where each AGV in the alley will perform the job and the loading/unloading position where the to-be-driven-in AGV will perform the job; and when the AGV scheduling system determines that the loading/unloading position where the to-be-driven-in AGV will perform the job is outside the alley relative to the loading/unloading position where any AGV in the alley will perform the job, sending a driving-in permission message to the to-be-driven-in AGV through the AGV scheduling system, to schedule the to-be-driven-in AGV to perform the job in the alley.

3. The AGV scheduling method based on the alley of claim 2, further comprising:
  in the AGV scheduling system, pre-configuring an upper limit threshold for the number of the AGVs allowed to stay in the alley at the same time; and
  when the AGV scheduling system determines that the number of the AGVs in the alley at the current moment reaches the upper limit threshold, sending no driving-in permission message to the to-be-driven-in AGV through the AGV scheduling system.

4. The AGV scheduling method based on the alley of claim 2, further comprising:
  after the AGV scheduling system sends a driving-in permission message to the to-be-driven-in AGV, recording the number of the to-be-driven-in AGV and the number of the driving-in alley through the AGV scheduling system, to dynamically schedule the quantity of the AGVs in the alley in combination with the AGV scheduling system.

5. The AGV scheduling method based on the alley of claim 2, further comprising:
  after the AGV scheduling system receives a message that one AGV in one alley arrives at the driving-out platform, clearing the recorded number of the AGV arriving at the driving-out platform and the number of the driving-out alley through the AGV scheduling system, to dynamically schedule the quantity of the AGVs in the alley in combination with the AGV scheduling system.

6. The AGV scheduling method based on the alley of claim 1, wherein when the AGV scheduling system determines that the running direction of each AGV in the alley at the current moment is towards the direction of driving away from its loading/unloading position or each AGV therein is performing the job at its loading/unloading position, the method further comprises:
  determining a relative position between the current running position of each AGV in the alley and the loading/unloading position where the to-be-driven-in AGV will perform the job; and when the AGV scheduling system determines that a distance between the loading/unloading position where the to-be-driven-in AGV will perform the job and the current running position of any AGV in the alley is greater than a distance between the to-be-driven-in AGV and the loading/unloading position where the to-be-driven-in AGV will perform the job, sending a driving-in permission message to the to-be-driven-in AGV through the AGV scheduling system, to schedule the to-be-driven-in AGV to perform the job in the alley.

7. The AGV scheduling method based on the alley of claim 6, further comprising:
  in the AGV scheduling system, pre-configuring an upper limit threshold for the number of the AGVs allowed to stay in the alley at the same time; and
  when the AGV scheduling system determines that the number of the AGVs in the alley at the current moment reaches the upper limit threshold, sending no driving-in permission message to the to-be-driven-in AGV through the AGV scheduling system.

8. The AGV scheduling method based on the alley of claim 6, further comprising:
  after the AGV scheduling system sends a driving-in permission message to the to-be-driven-in AGV, recording the number of the to-be-driven-in AGV and the number of the driving-in alley through the AGV scheduling system, to dynamically schedule the quantity of the AGVs in the alley in combination with the AGV scheduling system.

9. The AGV scheduling method based on the alley of claim 6, further comprising:
  after the AGV scheduling system receives a message that one AGV in one alley arrives at the driving-out platform, clearing the recorded number of the AGV arriving at the driving-out platform and the number of the driving-out alley through the AGV scheduling system, to dynamically schedule the quantity of the AGVs in the alley in combination with the AGV scheduling system.

10. The AGV scheduling method based on the alley of claim 1, further comprising:
  in the AGV scheduling system, pre-configuring an upper limit threshold for the number of the AGVs allowed to stay in the alley at the same time; and
  when the AGV scheduling system determines that the number of the AGVs in the alley at the current moment reaches the upper limit threshold, sending no driving-in permission message to the to-be-driven-in AGV through the AGV scheduling system.

11. The AGV scheduling method based on the alley of claim 1, further comprising:
  after the AGV scheduling system sends a driving-in permission message to the to-be-driven-in AGV, recording the number of the to-be-driven-in AGV and the number of the driving-in alley through the AGV scheduling system, to dynamically schedule the quantity of the AGVs in the alley in combination with the AGV scheduling system.

12. The AGV scheduling method based on the alley of claim 1, further comprising:
  after the AGV scheduling system receives a message that one AGV in one alley arrives at the driving-out platform, clearing the recorded number of the AGV arriving at the driving-out platform and the number of the driving-out alley through the AGV scheduling system, to dynamically schedule the quantity of the AGVs in the alley in combination with the AGV scheduling system.

13. Electronic equipment, comprising a processor and a memory, wherein computer-readable instructions are stored on the memory, and when the computer-readable instructions are executed by the processor, the AGV scheduling method based on the alley according to claim 1 is implemented.

14. The electronic equipment of claim 13, wherein in the AGV scheduling method based on the alley, the determining, through the AGV scheduling system, whether the to-be-driven-in AGV can enter the alley for performing the job according to the number of the AGVs in the alley at the current moment, the job information and a loading/unloading position where the to-be-driven-in AGV will perform the job comprises:

when the AGV scheduling system determines that the running direction of each AGV in the alley at the current moment is towards the direction of its loading/unloading position, further determining a relative position between the loading/unloading position where each AGV in the alley will perform the job and the loading/unloading position where the to-be-driven-in AGV will perform the job; and when the AGV scheduling system determines that the loading/unloading position where the to-be-driven-in AGV will perform the job is outside the alley relative to the loading/unloading position where any AGV in the alley will perform the job, sending a driving-in permission message to the to-be-driven-in AGV through the AGV scheduling system, to schedule the to-be-driven-in AGV to perform the job in the alley.

15. The electronic equipment of claim 13, wherein in the AGV scheduling method based on the alley, the determining, through the AGV scheduling system, whether the to-be-driven-in AGV can enter the alley for performing the job according to the number of the AGVs in the alley at the current moment, the job information and a loading/unloading position where the to-be-driven-in AGV will perform the job comprises:

when the AGV scheduling system determines that the running direction of each AGV in the alley at the current moment is towards the direction of driving away from its loading/unloading position or each AGV therein is performing the job at its loading/unloading position, further determining a relative position between the current running position of each AGV in the alley and the loading/unloading position where the to-be-driven-in AGV will perform the job; and when the AGV scheduling system determines that a distance between the loading/unloading position where the to-be-driven-in AGV will perform the job and the current running position of any AGV in the alley is greater than a distance between the to-be-driven-in AGV and the loading/unloading position where the to-be-driven-in AGV will perform the job, sending a driving-in permission message to the to-be-driven-in AGV through the AGV scheduling system, to schedule the to-be-driven-in AGV to perform the job in the alley.

16. A non-transitory computer readable storage medium on which a computer program is stored, wherein when the computer program is executed by a processor, the AGV scheduling method based on the alley according to claim 1 is implemented.

17. Electronic equipment, comprising a processor and a memory, wherein a computer program stored on the memory that, when executed by the processor, causes an operating system to perform acts;

wherein a scheduling site comprises a plurality of alleys and an AGV system, wherein each of the alleys is provided with a plurality of loading/unloading positions, and the AGV system comprises an AGV scheduling system and a plurality of AGVs; the AGVs are allowed to drive in and out from one end of the alley, while the other end thereof is closed or the AGVs are not allowed to drive in and out from the other end thereof, and only one AGV is allowed to drive in and out in a width direction of the alley at a time; an electronic map of each AGV is pre-configured with information of a driving-in platform and a driving-out platform, wherein the driving-in platform is located in an entrance direction of the alley, and the driving-out platform is located in an exit direction of the alley;

wherein the computer program causes the operating system to perform acts comprises:

receiving, through the AGV scheduling system, a message that a to-be-driven-in AGV arrives at a driving-in platform;

obtaining, through the AGV scheduling system, job information of each AGV in the alley at the current moment, and statistically obtaining the number of the AGVs in the alley at the current moment, wherein the job information of each AGV includes one or more of a running direction, a job status, a loading/unloading position of the job, and current running positions; and determining, through the AGV scheduling system, whether the to-be-driven-in AGV can enter the alley for performing the job according to the number of the AGVs in the alley at the current moment, the job information and a loading/unloading position where the to-be-driven-in AGV will perform the job;

wherein, the determining, through the AGV scheduling system, whether the to-be-driven-in AGV can enter the alley for performing the job according to the number of the AGVs in the alley at the current moment, the job information and a loading/unloading position where the to-be-driven-in AGV will perform the job comprises:

when the AGV scheduling system determines that the number of the AGVs in the alley at the current moment is zero, sending a driving-in permission message to the to-be-driven-in AGV through the AGV scheduling system, to schedule the to-be-driven-in AGV to perform the job in the alley; or when the AGV scheduling system determines that the number of the AGVs in the alley at the current moment is not zero, further comprehensively determining whether the to-be-driven-in AGV can enter the alley for performing the job according to a relative position between the loading/unloading position where each AGV in the alley will perform the job and the loading/unloading position where the to-be-driven-in AGV will perform the job and/or a relative position between the current running position of each AGV in the alley and the loading/unloading position where the to-be-driven-in AGV will perform the job.

18. The electronic equipment of claim 17, wherein when the AGV scheduling system determines that the running direction of each AGV in the alley at the current moment is towards the direction of its loading/unloading position, the computer program causes the operating system to perform acts further comprises:

determining a relative position between the loading/unloading position where each AGV in the alley will perform the job and the loading/unloading position where the to-be-driven-in AGV will perform the job; and when the AGV scheduling system determines that the loading/unloading position where the to-be-driven-in AGV will perform the job is outside the alley relative to the loading/unloading position where any AGV in the alley will perform the job, sending a driving-in permission message to the to-be-driven-in AGV through the AGV scheduling system, to schedule the to-be-driven-in AGV to perform the job in the alley.

19. The electronic equipment of claim 17, wherein when the AGV scheduling system determines that the running direction of each AGV in the alley at the current moment is towards the direction of driving away from its loading/unloading position or each AGV therein is performing the job at its loading/unloading position, the computer program causes the operating system to perform acts further comprises:

determining a relative position between the current running position of each AGV in the alley and the loading/unloading position where the to-be-driven-in AGV will perform the job; and when the AGV scheduling system determines that a distance between the loading/unloading position where the to-be-driven-in AGV will perform the job and the current running position of any AGV in the alley is greater than a distance between the to-be-driven-in AGV and the loading/unloading position where the to-be-driven-in AGV will perform the job, sending a driving-in permission message to the to-be-driven-in AGV through the AGV scheduling system, to schedule the to-be-driven-in AGV to perform the job in the alley.

20. The electronic equipment of claim 17, wherein when the AGV scheduling system determines that the running directions of AGVs in the narrow-alley at the current moment comprise both the direction of driving away from the loading/unloading position and the direction of driving toward the loading/unloading position, the computer program causes the operating system to perform acts further comprises:

determining the relative positions among the current running position of each AGV in the alley, the loading/unloading position where each AGV in the alley will perform the job, and the loading/unloading position where the to-be-driven-in AGV will perform the job; and when the AGV scheduling system determines that a distance between the loading/unloading position where the to-be-driven-in AGV will perform the job and the current running position of each AGV in the alley is greater than a distance between the to-be-driven-in AGV and the loading/unloading position where the to-be-driven-in AGV will perform the job, and the loading/unloading position where the to-be-driven-in AGV will perform the job is outside the alley relative to the loading/unloading position where the AGV in the alley will perform the job, sending a driving-in permission message to the to-be-driven-in AGV through the AGV scheduling system, to schedule the to-be-driven-in AGV to perform the job in the alley.

* * * * *